United States Patent [19]

Vicari

[11] Patent Number: 4,962,147

[45] Date of Patent: Oct. 9, 1990

[54] PROCESS FOR THE SUSPENSION POLYMERIZATION OF 4-ACETOXYSTYRENE AND HYDROLYSIS TO 4-HYDROXYSTYRENE POLYMERS

[75] Inventor: Richard Vicari, Corpus Christi, Tex.

[73] Assignee: Hoechst Celanese Corporation, North Sommerville, N.J.

[21] Appl. No.: 199,553

[22] Filed: May 26, 1988

[51] Int. Cl.$^5$ ................................................ C08F 8/12
[52] U.S. Cl. .................................. 524/460; 524/563; 525/329.5; 525/367; 525/369; 525/378; 526/73
[58] Field of Search .......................... 526/73; 524/460; 525/329.5, 367, 369, 378

[56] References Cited

U.S. PATENT DOCUMENTS

| | | | |
|---|---|---|---|
| 3,726,848 | 4/1973 | Squire et al. | 526/73 |
| 3,817,965 | 6/1974 | Mace et al. | 526/73 |
| 4,125,696 | 11/1978 | Kamath | 526/73 |
| 4,129,703 | 12/1978 | Kamath et al. | 526/73 |
| 4,678,843 | 7/1987 | Elmore et al. | 525/378 |

Primary Examiner—Bernard Lipman
Attorney, Agent, or Firm—Donald R. Cassady; Herb P. Price

[57] ABSTRACT

Poly(4-hydroxystyrene) is prepared by aqueous suspension polymerization of 4-acetoxystyrene monomer followed by hydrolysis with ammonium hydroxide.

28 Claims, No Drawings

PROCESS FOR THE SUSPENSION POLYMERIZATION OF 4-ACETOXYSTYRENE AND HYDROLYSIS TO 4-HYDROXYSTYRENE POLYMERS

Background of the Invention

The field of art to which this invention pertains is homopolymers of 4-acetoxystyrene and 4-hydroxystyrene.

Homopolymers and copolymers of 4-hydroxystyrene, or p-vinylphenol as it is also called, are known compositions which have been used, for example, in the manufacture of metal treatment compositions, photoresists, epoxy resins and epoxy resin curing agents. Polymers of 4-hydroxystyrene can be made by polymerizing 4-hydroxystyrene itself. However, 4-hydroxystyrene is an unstable compound and must be refrigerated to prevent it from polymerizing spontaneously. Even under refrigeration, the monomer will slowly polymerize to low molecular weight polymers. 4-Acetoxystyrene, the acetic acid ester of 4-hydroxystyrene, is a stable monomer which can be readily homopolymerized and copolymerized to low, medium and high molecular weight polymers. After polymerization, the phenolic ester group can be hydrolyzed to produce 4-hydroxystyrene polymers.

Corson et al., Journal of Organic Chemistry, 23, 544-549 (1958), describe a 5 step process for making 4-hydroxystyrene from phenol. The phenol is first acetylated to 4-hydroxyacetophenone which is then acetylated to 4-acetoxyacetophenone. This compound is hydrogenated to 4-acetoxyphenylmethyl carbinol which is then dehydrated to 4-acetoxystyrene. The 4-acetoxystyrene is saponified to 4-hydroxystyrene using potassium hydroxide.

The ester interchange reaction of poly(4-acetoxystyrene) in methanol using sodium methylate is described in U.S. Pat. No. 2,276,138. About 84 percent of the acetate groups are removed by the interchange reaction. Packham, in the Journal of the Chemical Society, 1964, 2617-2624, describes the hydrolysis of crosslinked poly(4-hydroxystyrene) by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethylammonium chloride as a phase transfer agent. Arshadt et al., Journal of Polymer Science, 12, 2017-2025 (1974), hydrolyzed copolymers of styrene and acetoxystyrene to the vinylphenol polymer using hydrazine hydrate in dioxane.

In copending commonly assigned patent application Ser. No. 007,541, filed Jan. 28, 1987, aqueous emulsions of polymers of 4-acetoxystyrene are hydrolyzed with a base to polymers of 4-hydroxystyrene.

In these prior art processes, the vinylphenol polymer is usually recovered as a solution. In order to obtain the polymer in solid form, it must be recovered from the solution by some means, such as by precipitation with a nonsolvent, acidification of the salt form of the polymer, spray drying, or the like. Such processes are time consuming and expensive, requiring additives and/or energy.

In copending, commonly assigned patent application Ser. No. 115,128, filed Oct. 30, 1987, 4-acetoxystyrene monomer is polymerized in aqueous suspension and the polymer is then hydrolyzed to poly(4-hydroxystyrene). Solutions of these polymers sometimes contain insoluble by-products which can cause problems in some uses.

Summary of Invention

This invention is directed to polymers of 4-acetoxystyrene and 4-hydroxystyrene. In one aspect, the invention pertains to a process for preparing aqueous suspensions of poly(4-acetoxystyrene). In another aspect, the invention relates to a process for hydrolyzing poly(4-acetoxystyrene) in aqueous suspension to poly(4-hydroxystyrene).

By the process of this invention, 4-acetoxystyrene is suspended in water in the presence of polyacrylic acid and at least two free radical polymerization catalysts, one of which has a one hour half life below 100° C. and the other has a one hour half life above 100° C. Polymerization is conducted in at least two temperature stages, the one temperature stage being at or below 95° C., the other stage being above 95° C. The resulting polymer while in suspension is hydrolyzed with ammonia to poly(4-hydroxystyrene) and the polymer is recovered in particulate form from the aqueous suspension.

Description of the Invention

In carrying out the process of this invention, 4-acetoxystyrene monomer is dispersed in water using polyacrylic acid as the suspending aid in the amount of about 0.5 to about 2 weight percent based on the water and preferably about 0.75 to about 1.5 weight percent. The polyacrylic acid has a molecular weight of about 50,000 to about 500,000 and preferably, about 150,000 to about 250,000.

The acetoxystyrene monomer is added to the water in the amount of about 5 to about 30 weight percent based on the weight of monomer and water.

The suspension polymerization of the dispersed 4-acetoxystyrene monomer is catalyzed by at least two free radical polymerization catalysts, the one catalyst having a one hour half life of one hour at a temperature of 100° C. or below, the other catalyst having a 1 hour half life at a temperature above 100° C. Preferably, the one catalyst will have a half life of 1 hour at about 70° to about 100° C. and, most preferably, at about 85° to about 95° C. The other catalyst, preferably, will have a half life of about 101° C. to about 140° C., and, most preferably, at about 115° C. to about 125° C.

The amount of each free radical catalyst used in the polymerization process will be from about 0.1 to about 10 weight percent based on the weight of monomer and, preferably, about 0.5 to about 6 weight percent. Most preferably, the catalyst having the lower one hour half life temperature will be used in the amount of about 2 to about 6 weight percent based on the monomer, and the other catalyst will be used in the amount of about 0.5 to about 2 weight percent.

Examples of useful free radical polymerization catalysts having a one hour half life at 100° C. or below include benzoyl peroxide, diisononanoyl peroxide, decanoyl-peroxide, lauroyl peroxide, succinic acid peroxide, acetyl peroxide, t-amylperoxy-pivalate, t-butylperoxy-pivalate, 2,5-dimethyl-2,5-di(2-ethylhexanoylperoxy) hexane, t-amylperoxy-2-ethylhexanoate, t-butyl-peroxy-2-ethylhexanoate, t-butyl-peroxyisobutyrate, t-butylperoxybenzoate, 2,2'-azobis(2,4-dimethylvaleronitrile), 2,2'-azobis(isobutyronitrile), 2,2'-azobis(methylbutyronitrile) and the like. A particularly preferred catalyst is benzoyl peroxide.

Examples of useful free radical polymerization catalysts having a one hour half life above 100° C. include t-butylperoxymaleic acid, t-butylhydroperoxide, n-butyl-4,4-bis(t-butylperoxy)valerate, 1,1-di(t-butylperoxy) 3,3,5-trimethylcyclohexane, 1,1-di(t-butylperoxy) cyclohexane 1,1-di(t-amylperoxy) cyclohexane, 2,2-di(t-butylperoxy) butane, 2,2-di(t-amyl peroxy) propane, t-butyl(2-ethylhexyl) monoperoxy carbonate, t-amyl(2-ethylhexyl) mono peroxy carbonate, t-butylperoxy acetate, t-butylperoxy benzoate 1,1-azobis (cyanocyclohexane), and the like. Particularly preferred catalysts are t-butyl(2-ethylhexyl) monoperoxy carbonate and t-butylperoxy benzoate which is also called t-butyl perbenzoate.

The polymerization process of this invention is conducted by adding all of the reactants to the reactor using sufficient agitation to form a fine suspension of the monomer and polymerizing in two temperature stages. The first state is conducted at a temperature of about 70° C. to about 95° C., preferably, about 80° C. to about 90° C., for a time sufficient to polymerize at least about 50 weight percent of the monomer to polymer, and, preferably, about 70 to about 98 weight percent. The second stage is conducted at a temperature above 95° C. to 100° C., i.e., the reflux temperature at atmosphere pressure for a time sufficient to convert substantially all, i.e., at least about 99 percent, of the monomer to polymer. Preferably, the second stage is conducted at reflux temperature.

The time required to complete each stage of the process will vary depending upon the particular catalyst used, the amount of catalyst and the temperature at which the reaction is conducted. Generally, the first stage of the reaction is conducted for about 1 to about 3 hours and the second stage is conducted for about 1 to about 24 hours.

When the polymerization is completed, the poly(4-acetoxystyrene) can be recovered in particulate form by centrifugation and/or filtration to remove the water. After washing and drying, the polymer can be used as a modifier for adhesives, engineering resins, powder coatings, and the like.

Preferably, after the 4-acetoxystyrene polymerization is completed, the polymer is hydrolyzed with ammonia to poly(4-hydroxystyrene) while still in suspension in the polymerization medium.

Ammonia is preferably used as ammonium hydroxide, i.e., as an aqueous solution of ammonia at a concentration of about 10 weight percent ammonia in water up to about 30 weight percent. Preferably, the solution will contain about 25 to about 30 weight percent ammonia. Ammonia can also be used in gaseous form. When used as a gas, it is preferably introduced into the reactor as a sparge below the surface of the aqueous reaction medium.

The amount of ammonia which is used to carry out the hydrolysis of acetoxy groups to phenolic groups is at least about two mole of base for each equivalent of acetoxy group that is to be hydrolyzed. If complete hydrolysis is desired, then at least two mole of nitrogen base is added for each molar equivalent of 4-acetoxystyrene in the suspension polymer. If less than complete hydrolysis is desired, then less nitrogen base is used but still on the basis of two equivalents for each equivalent of 4-acetoxystyrene to be hydrolyzed.

After adding the ammonia, the suspension is heated at about 30° C. to about 95° C., preferably about 60° C. to about 90° C., until the desired amount of hydrolysis is obtained. Generally, the time required will be about two hours to about 10 hours.

During the hydrolysis reaction, the suspended polymer remains in suspension in solid finely divided form. Surprisingly, the hydrolysis reaction takes place not only on the surface of the particle but within the particle. When the hydrolysis reaction is completed, the water is removed by decantation, filtration or centrifugation. After washing and drying, the polymer is ready for use.

The polymers made by the process of this invention have molecular weights (Mw) of at least about 6,000 up to about 500,000. The desired molecular weight within this range can be obtained through catalyst selection, amount of catalyst used in each stage, use of chain transfer agents and by controlling the extent of the polymerization reaction in the first stage.

The preferred molecular weight range for poly(4-hydroxystyrene) when used in metal treatment compositions is about 6,000 to about 30,000. These molecular weights are obtained by using about 3 to about 6 weight percent catalyst having a one hour half-life at 100° C. or below and by conducting the first stage reaction for a time sufficient to polymerize about 75 to about 95 weight percent of the monomers to polymers. Chain transfer agents, e.g., mercaptans and alcohols, can also be used. A preferred chain transfer agent is alpha methyl styrene dimer.

The following examples describe the invention in more detail. Parts and percentages are by weight unless otherwise indicated.

Example 1

To a suitable reactor are added 250 parts of water and 2.5 parts of polyacrylic acid having a molecular weight of 190,000. Agitation is begun and a monomer catalyst solution of 20.17 parts of 4-acetoxystyrene (ASM), 0.65 part of benzoyl peroxide and 0.26 part of t-butyl perbenzoate is added. Heat is applied raising the temperature to 85° C. The temperature is held at 85° C. for 2 hours. The temperature is then raised to 100° C. over 9 minutes and is held at 100° C. for 2 hours. After cooling, the poly(4-acetoxystyrene) is recovered by filtration to remove the aqueous polymerization medium. The finely divided polymer is washed and dried. The polymer has a molecular weight of Mw of 24,400 and Mn of 10,900. Gas chromatographic (G.C.) analysis shows .8 weight percent ASM residue in the polymer.

Example 2

To a suitable reactor are added 250 parts of water and 2.5 parts of polyacrylic acid having a molecular weight of 190,000. Agitation is begun and a monomer-catalyst solution of 0.68 part of benzoyl peroxide and 0.22 part of t-butyl (2-ethylhexyl) mono peroxy carbonate. Heat is applied raising the temperature to 85° C. The temperature is held for one hour at 85° C. and is then raised to 100° C. over 40 minutes. Heating at 100° C. to 101° C. (reflux) is continued for 1 hour and 25 minutes. At the end of this heating period, a suspension of finely divided particles of poly(4-acetoxystyrene) is obtained. The polymer has a molecular weight (Mw) of 23,000.

To the aqueous suspension are added 19.23 parts of 28 weight percent ammonia in water. With agitation, heat is applied raising the temperature to 85° C. The temperature is held at 85° C. for 4 hours. During the heating period, no change is detected in the appearance, shape, or size of the particles. At the end of the heating period, the suspension is filtered to recover the solid finely divided polymer. The polymer is washed several times with water until no odor of ammonia is detected. The polymer is substantially completely hydrolyzed poly(4-hydroxystyrene) as determined by infrared analysis. When dissolved in tetrahydrofuran, a clear solution with no insolubles is obtained.

Example 3

To a suitable reactor are added 500 parts of water and 5 parts of polyacrylic acid having a molecular weight of 190,000. Agitation is begun and a solution of 9 parts of benzoyl peroxide, 6.06 parts of alpha methyl styrene dimer, 1.52 parts of t-butyl perbenzoate, and 300.1 parts of 4-acetoxystyrene is added and dispersed in the water. Heat is applied raising the temperature to 85° C. The temperature is held at 84–88° C. for 2 hours. At the end of this heating period, GC analysis indicates that 14.0 percent monomer remained unpolymerized. The temperature is raised to 100° C. and is held at this temperature for 18.5 hours. GC analysis indicates that 0.3 percent monomer remains unpolymerized. The polymer as determined by GPC has a molecular weight (Mw) of 16,200 and (Mn) of 7,900.

The poly(4-acetoxystyrene) suspension is cooled to 18° C. and 264 parts of 28 percent aqueous ammonia are added. The temperature is raised to 85° C. and is held at 82–85° C. for 7 hours. Infrared analysis indicates incomplete hydrolysis of the acetoxy groups. Additional aqueous ammonia, 17.94 parts, is added and heating at 85° C. is continued for about 19 hours. More aqueous ammonia, 30.5 parts and 140.65 parts, are added and heating at 84–85° C. is continued for about 5 hours. At the end heating period, infrared analysis indicates complete hydrolysis of the acetoxy groups to phenolic groups. The suspension is filtered and the recovered polymer particles are washed with water until no odor of ammonia is detected. When dissolved in tetrahydrofuran, a clear solution with no residue is obtained.

Example 4

Using the procedure described in Example 1, a solution of 1.21 parts of benzoyl peroxide, 0.23 part of t-butyl perbenzoate and 1.01 parts of alpha methylstyrene dimer in 20.57 parts of 4-acetoxystyrene monomer is added to a solution of 2.5 parts of polyacrylic acid having a molecular of 190,000 in 250 parts of water. Heating is conducted at 86° C. for 3 hours followed by heating at 101° C. for 20 hours. The residual monomer content after the first stage reaction is 6.4 percent and at the end of the reaction, the residual monomer content is 0.3 percent. The molecular weight is 8,700 Mw and 3,400 Mn.

Example 5–9

Using the same procedures described in the preceding examples, additional suspension polymerizations of 4-acetoxystyrene monomer are conducted. The amounts of catalysts, polymerization temperatures and times for each stage, residual 4-acetoxystyrene monomer and molecular weight of the polymer are shown in Table 1. Abbreviations used in the headings are:

BPO - benzoyl peroxide
TBPB - t-buty perbenzoate
MSD - alpha methylstyrene dimer
ASM - 4-acetoxystyrene monomer
1S - 1st stage
2S - 2nd stage

TABLE I

| Example | | BPO % | TBPB % | MSD % | Temp C. | Time hr | ASM % | Mw |
|---|---|---|---|---|---|---|---|---|
| 5 | 1S | 1 | 0.5 | | 85 | 2.0 | 14.0 | |
| | 2S | | | | | 1.0 | 2.0 | 1.1 | 50K |
| 6 | 1S | 1.5 | 0.5 | | 87 | 2.0 | 5.2 | |
| | 2S | | | | 100 | 2.0 | 1.0 | 50K |
| 7 | 1S | 1 | 0.5 | | 85 | 2.0 | 25.4 | |
| | 2S | | | | 100 | 17.0 | 0.3 | 59K |
| 8 | 1S | 6 | 0.2 | 5 | 85 | 2.0 | 15.1 | |
| | 2S | | | | 100 | 19.0 | 1.2 | 9K |
| 9 | 1S | 6 | 0.5 | 5 | 85 | 2.0 | 11.0 | |
| | 2S | | | | 100 | 20.0 | 0.6 | 9K |

Example 10

Using the same procedure described hereinbefore, additional suspension polymerizations of 4-acetoxystyrene monomer are conducted. In these examples t-butyl-(2-ethylhexyl) monoperoxycarbonate (TBEC) is used as the second stage (2S) catalyst. The amounts of catalysts, conditions, residual monomer and molecular weights are shown in Table II.

TABLE II

| Example | | BPO % | TBEC % | MSD % | Temp C. | Time hr | ASM % | MW |
|---|---|---|---|---|---|---|---|---|
| 10 | 1S | 6 | 1 | 5 | 85 | 1.0 | 26.0 | |
| | 2S | | | | 100 | 19.0 | 0.4 | 9K |
| 11 | 1S | 1 | 1 | | 85 | 1.0 | | |
| | 2S | | | | 100 | 19.0 | 0.05 | 71K |
| 12 | 1S | 3 | 1 | | 85 | 2.0 | 11.4 | |
| | 2S | | | | 101 | 20.5 | 0.0 | 26K |
| 13 | 1S | 3 | 1.5 | | 86 | 2.0 | 10.3 | |
| | 2S | | | | 99 | 18.5 | 0.04 | 24K |
| 14 | 1S | 5 | 1 | | 84 | 2.0 | 9.84 | |
| | 2S | | | | 99 | 17.0 | 0.16 | 15K |
| 15 | 1S | 0.3 | 0.5 | | 87 | 2.0 | 49.3 | |
| | 2S | | | | 100 | 17.5 | 0.07 | 288K |
| 16 | 1S | 3 | 1 | | 86 | 2.2 | 5.7 | |
| | 2S | | | | 100 | 18.0 | 0.0 | 25K |
| 17 | 1S | 6 | 1.5 | 5 | 86 | 2.0 | 15.5 | |
| | 2S | | | | 101 | 16.0 | 0.8 | 8K |
| 18 | 1S | 0.5 | 0.5 | | 87 | 2.0 | | |
| | 2S | | | | 101 | 19.5 | 0.14 | 111K |

The 4-acetoxystyrene polymers can be hydrolyzed to 4-hydroxystyrene polymers using ammonia as described hereinbefore.

The principles, preferred embodiments and modes of operation of the present invention have been described in the foregoing specification. The invention which is intended to be protected herein, however, is not to be construed as limited to the particular forms disclosed, since there are to be regarded as illustrating rather than restrictive. Variations and changes may be made by those skilled in the art without departing from the spirit of the invention.

What is claimed is:

1. A process for preparing an aqueous suspension of poly(4-acetoxystyrene) which comprises:
    (a) forming a suspension of about 5 to about 30 weight percent 4-acetoxystyrene monomer in water, wherein said weight percent is based on the weight of monomer and water, in the presence of polyacrylic acid and at least two free-radical polymerization catalysts wherein one catalyst has a half life of one hour at a temperature below 100° C. and the other has a half life of one hour at a temperature above 100° C.;

(b) heating the suspension at a temperature of about 70° C. to about 95° C. until the conversion of monomer to polymer is at least about 50 percent by weight; and (c) heating the suspension at a temperature above 95° C. to about 100° C. until the conversion of monomer to polymer is substantially complete.

2. The process of claim 1 wherein the polyacrylic acid has a molecular weight of about 50,000 to about 500,000 and is present in the amount of about 0.5 to about 2 percent by weight based on the weight of water.

3. The process of claim 2 wherein the polyacrylic acid has a molecular weight of about 150,000 to about 250,000 and is present in the amount of about 0.75 to about 1.5 percent by weight.

4. The process of claim 1 wherein the first free radical polymerization catalyst has a half life of one hour at a temperature of about 70° C. to about 100° C.

5. The process of claim 4 wherein the catalyst has a half life of one hour at a temperature of about 85° C. to about 95° C.

6. The process of claim 5 wherein the catalyst is benzoyl peroxide.

7. The process of claim 1 wherein the other free radical polymerization catalyst has a half life of 1 hour at a temperature of about 101° C. to about 140° C.

8. The process of claim 7 wherein the catalyst has a half life of one hour at about 115° C. to about 125° C.

9. The process of claim 8 wherein the catalyst is t-butyl(2-ethylhexyl) monoperoxy carbonate.

10. The process of claim 8 wherein the catalyst is t-butylperoxy benzoate.

11. The process of claim 1 wherein each free radical polymerization catalyst is present in the amount of about 0.1 to about 10 weight percent based on the weight of monomer.

12. The process of claim 11 wherein the amount of each catalyst is about 0.5 about 6 weight percent.

13. A process for preparing 4-hydroxystyrene polymer which comprises:

(I.) preparing an aqueous suspension of poly(4-acetoxytyrene by the steps of:
a. forming a suspension of about 5 to about 30 weight percent 4-acetoxystyrene monomer in water, wherein said weight percent is based on the weight of monomer and water, in the presence of polyacrylic acid and at least two free-radical polymerization catalysts wherein one catalysts has a half life of one hour at a temperature below 100° C. and the other has a half life at one hour at a temperature above 100° C.;

(b) heating the suspension at a temperature of about 70° C. to about 95° C. until the conversion of monomer to polymer is at least about 50 percent by weight; and (c) heating the suspension at a temperature above 95° C. to about 100° C. until the conversion of monomer to polymer is substantially complete; and (II) preparing the 4-hydroxystyrene polymer by the steps of:

(a) lowering the temperature to below 95° C.;

(b) reacting the 4-acetoxystyrene polymer with ammonia in the amount of at least two moles of ammonia for each equivalent of acetoxystyrene to be hydrolyzed; and (c) recovering the 4-hydroxystyrene polymer in finely divided particulate form from the aqueous suspension.

14. The process of claim 13 wherein the polyacrylic acid has a molecular weight of about 50,000 to about 500,000 and is present in the amount of about 0.5 to about 2 percent by weight based on the weight of water.

15. The process of claim 14 wherein the polyacrylic acid has a molecular weight of about 150,000 to about 250,000 and is present in the amount of about 0.75 to about 1.5 percent by weight.

16. The process of claim 13 wherein the first free radical polymerization catalyst has a half life of one hour at a temperature of about 70° C. to about 100° C.

17. The process of claim 16 wherein the catalyst has a half life of one hour at a temperature of about 85° C. to about 95° C.

18. The process of claim 17 wherein the catalyst is benzoyl peroxide.

19. The process of claim 13 wherein the other free radical polymerization catalyst has a half life of 1 hour at a temperature of about 101° C. to about 140° C.

20. The process of claim 19 wherein the catalyst has a half life of one hour at about 115° C. to about 125° C.

21. The process of claim 20 wherein the catalyst is t-butyl(2-ethylhexyl) monoperoxy carbonate.

22. The process of claim 20 wherein the catalyst is t-butyl peroxybenzoate.

23. The process of claim 13 wherein each free radical polymerization catalyst is present in the amount of about 0.1 to about 10 weight percent based on the weight of monomer.

24. The process of claim 23 wherein the amount of each catalyst is about 0.5 to about 6 weight percent.

25. The process of claim 13 wherein the temperature in II (a) is between about 30° C. and about 95° C.

26. The process of claim 25 wherein the temperature is between about 60° C. and about 90° C.

27. The process of claim 13 wherein the ammonia is gaseous ammonia.

28. The process of claim 13 wherein the ammonia is ammonium hydroxide.

* * * * *